United States Patent
Wang et al.

(10) Patent No.: US 10,550,279 B2
(45) Date of Patent: Feb. 4, 2020

(54) ANTIMICROBIAL COATING COMPOSITION WITH IMPROVED YELLOWING RESISTANCE

(71) Applicants: Dow Global Technologies LLC, Midland, MI (US); Rohm and Haas Company, Philadelphia, PA (US)

(72) Inventors: Tao Wang, Shanghai (CN); Junyu Chen, Shanghai (CN)

(73) Assignees: Dow Global Technologies LLC, Midland, MI (US); Rohm and Haas Company, Philadelphia, PA (US)

(*) Notice: Subject to any disclaimer, the term of this patent is extended or adjusted under 35 U.S.C. 154(b) by 0 days.

(21) Appl. No.: 15/313,156

(22) PCT Filed: Jun. 30, 2014

(86) PCT No.: PCT/CN2014/081170
§ 371 (c)(1),
(2) Date: Nov. 22, 2016

(87) PCT Pub. No.: WO2016/000131
PCT Pub. Date: Jan. 7, 2016

(65) Prior Publication Data
US 2017/0183530 A1   Jun. 29, 2017

(51) Int. Cl.
| C09D 133/14 | (2006.01) |
| C09D 5/14 | (2006.01) |
| C08K 9/10 | (2006.01) |
| C08L 33/08 | (2006.01) |
| C09D 133/08 | (2006.01) |
| C09D 7/61 | (2018.01) |
| C08K 3/08 | (2006.01) |
| C08K 3/22 | (2006.01) |

(52) U.S. Cl.
CPC .............. C09D 133/14 (2013.01); C08K 9/10 (2013.01); C08L 33/08 (2013.01); C09D 5/14 (2013.01); C09D 7/61 (2018.01); C09D 133/08 (2013.01); C08K 2003/0806 (2013.01); C08K 2003/2241 (2013.01)

(58) Field of Classification Search
CPC .... C08K 9/10; C08K 3/22; C08K 2003/2241; C09D 5/14
See application file for complete search history.

(56) References Cited

U.S. PATENT DOCUMENTS

| 3,890,268 | A | * | 6/1975 | Tanzilli | .................... | C08K 3/22 |
| | | | | | | 524/497 |
| 5,360,827 | A | | 11/1994 | Toda et al. | | |
| 7,482,054 | B2 | | 1/2009 | Tarng et al. | | |
| 7,579,081 | B2 | | 8/2009 | Brown | | |
| 7,601,212 | B2 | | 10/2009 | Sabesan et al. | | |
| 8,283,404 | B2 | * | 10/2012 | Allen | .................... | B82Y 30/00 |
| | | | | | | 524/497 |
| 2006/0291254 | A1 | * | 12/2006 | Jeong | ................ | G02F 1/133604 |
| | | | | | | 362/632 |
| 2010/0063171 | A1 | | 3/2010 | Roschmann et al. | | |
| 2011/0196088 | A1 | | 8/2011 | Hawkett et al. | | |
| 2011/0243882 | A1 | | 10/2011 | Dong et al. | | |
| 2012/0277346 | A1 | | 11/2012 | Fan et al. | | |

FOREIGN PATENT DOCUMENTS

| CN | 103062961 A | 4/2013 |
| CN | 103738035 A | 4/2014 |
| EP | 0022633 A2 | 1/1981 |
| EP | 40418 A1 | 11/1981 |
| EP | 0915108 A1 | 5/1999 |
| EP | 0959176 A1 | 11/1999 |
| EP | 2371221 A2 | 10/2011 |
| WO | 0068304 A1 | 11/2000 |

OTHER PUBLICATIONS

Viala et al., "Pigment Encapsulation by Emulsion Polymerisation, Redespersible in Water"; Macromolecular Symposia; 2002; vol. 187; 651-661.
International Search Report for International Application No. PCT/CN2014/081170; International Filing Date Jun. 30, 2014; dated Feb. 27, 2015; 3 pages.
"Modern Waterborne Coating Process, Formulation, Application", edited by Gen Yaozong, Beijing: China Petrochemical Press, pp. 307-308, Mar. 2003.
"Salt Chemical Production Technology", edited by Xu Xiaohui, Beijing: China Central Radio and Television University Press, p. 210, Jan. 2014.
"Sulfuric acid method for titanium pigment production", Pei Run et al., Beijing: Chemical Industry Press, pp. 23-24, 458-459, Feb. 1982.
CN Office Action, CN Application No. 201480080056.X, dated Oct. 9, 2019.
Q&A on Production Technology of Titanium Pigment, edited by Chen Chaohua, Beijing: Chemical Industry Press, pp. 17-18, Apr. 1998.

* cited by examiner

*Primary Examiner* — Brieann R Johnston
(74) *Attorney, Agent, or Firm* — Karl E. Stauss; Cantor Colburn LLP

(57) ABSTRACT

An antimicrobial coating composition comprising, i) a first polymer; ii) from 50 ppm to 2000 ppm of at least one of silver ions and silver element; and iii) from 10% to 60% of titanium dioxide particles. From 50% to 100% of the titanium dioxide particles are encapsulated by a second polymer; and the total amount of the first and the second polymers is from 5% to 80% by dry weight based on total dry weight of the coating composition.

9 Claims, No Drawings

ANTIMICROBIAL COATING COMPOSITION WITH IMPROVED YELLOWING RESISTANCE

FIELD OF THE INVENTION

The present invention relates to an antimicrobial coating composition with improved yellowing resistance.

INTRODUCTION

Silver ions or silver elements, when used in a coating, provide the coating with excellent antimicrobial performance. The higher the silver content is in the coating, the better the antimicrobial performance is. However, when the silver content is at a concentration of higher than 100 ppm in the coating, the coating may turn yellow.

It is therefore desired in the coating industry to have an antimicrobial coating composition with silver content higher than 100 ppm, yet with better yellowing resistance performance.

SUMMARY OF THE INVENTION

The present invention provides an antimicrobial coating composition comprising, i) a first polymer; by dry weight based on total dry weight of the coating composition, ii) from 50 ppm to 2000 ppm of at least one of silver ions and silver element; and iii) from 10% to 60% of titanium dioxide particles. From 50% to 100% of the titanium dioxide particles are encapsulated by a second polymer. The total amount of the first and the second polymers is from 5% to 80% by dry weight based on total dry weight of the coating composition.

DETAILED DESCRIPTION OF THE INVENTION

The coating composition of the present invention comprises (i) a first polymer; and by dry weight based on total dry weight of the coating composition (ii) from 50 ppm to 2000 ppm, preferably from 100 ppm to 1000 ppm, and more preferably from 200 ppm to 700 ppm, of a silver; and (iii) from 10% to 60%, preferably from 15% to 50%, and more preferably from 20% to 40%, of titanium dioxide particles. From 50% to 100%, preferably from 60% to 100%, and more preferably from 70% to 100% of the titanium dioxide particles are encapsulated by a second polymer.

The total amount of the first and the second polymers are from 5% to 80%, preferably from 10% to 70%, and more preferably from 15% to 60% by dry weight based on total dry weight of the coating composition.

The First and the Second Polymers

The first and the second polymers of the present invention can be the same or different.

The first and the second polymers both comprise at least one polymerized ethylenically unsaturated nonionic monomer. As used herein, the term "nonionic monomers" refers to monomers that do not bear an ionic charge between pH=1-14. Suitable examples of the ethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and any combination thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); ethylenically unsaturated monomers having a benzene ring such as styrene and substituted styrenes; butadiene; α-olefins such as ethylene, propylene, and 1-decene; vinyl acetate, vinyl butyrate, vinyl versatate and other vinyl esters; vinyl monomers such as vinyl chloride and vinylidene chloride; glycidyl (meth)acrylate; and any combination thereof.

Preferably, the ethylenically unsaturated nonionic monomers are selected from methyl methacrylate, ethyl acrylate, butyl acrylate, 2-ethylhexyl acrylate, styrene, vinyl acetate, vinyl butyrate, and any combination thereof.

At least one of the first and the second polymers may further comprise less than 10%, preferably less than 5%, and more preferably less than 2.5% by dry weight based on total dry weight of the polymer, of a stabilizer monomer. Suitable examples of the stabilizer monomers include sodium styrene sulfonate (SSS), sodium vinyl sulfonate (SVS), 2-acrylamido-2-methylpropane sulfonic acid (AMPS), acrylamide (AM), acrylic acid (AA), methylacrylic acid (MAA), and itaconic acid (IA).

Silver

In the present invention, silver is incorporated into the coating composition in silver element, i.e., $Ag^0$, or in oxidation state silver ions, i.e., $Ag^{1+}$, and is provided in silver solutions. Suitable examples of the silver solutions include silver nitrate, silver acetate, silver citrate, silver iodide, silver lactate, silver picrate, silver sulfate in deionized ("DI") water, and any combination thereof. Preferred examples of the silver solutions are silver nitrate and silver iodide. Besides DI water, other liquid mediums can also be used, such as water, aqueous buffered solutions and organic solutions such as polyethers or alcohols. The concentration of the silver in these solutions can vary from the concentration required to add a known quantity of silver, i.e., from 50 ppm to 2000 ppm, preferably from 100 ppm to 1000 ppm, and more preferably from 200 ppm to 700 ppm, by dry weight based on total dry weight of the coating composition as in the present invention, to the antimicrobial coating composition to a saturated silver solution. Commercially available silver solutions include SILVADUR™ 900, SILVADUR 930, SILVADUR 961 and SILVADUR ET from The Dow Chemical Company, and IRGAGUARD™ B 5000, IRGAGUARD B 5120, IRGAGUARD B 6000, IRGAGUARD D 1071 and IRGAGUARD H 6000 from BASF Company.

Titanium Dioxide Particles

Any titanium dioxide ($TiO_2$) particles can be used in the coating composition of the present invention. Commercially available titanium dioxide particles include TI-PURE™ R-706 and TI-PURE R-902+ from DuPont, TIONA™ 595 of Millennium Inorganic Chemicals, TIOXIDE™ TR92 from Huntsman Corporation, LOMON™ R-996 and LOMON LR-997 of LOMON Corporation, BILLION™ BLR-688 and BILLION BLR-699 from Henan Billions Chemical co., Ltd., DOGUIDE™ SR-237 from Shandong Doguide Group Co., Ltd., NTR-606 from Ningbo Xinfu Titanium Dioxide Co., Ltd., and R-2195 and R-2295 from Dawn Group. Preferably, the titanium dioxide particles are selected from TI-PURE™ R-706 and TI-PURE R-902+ available from DuPont.

The encapsulation of the second polymer on the surface of the titanium dioxide particles can be achieved by polymerization process. The polymerization process can be any method known in the art, including emulsion polymerization, mini-emulsion polymerization, and mechanical dispersing technology.

The Antimicrobial Coating Composition

The coating composition may further comprise other pigments or extenders.

As used herein, the term "pigment" refers to a particulate inorganic material which is capable of materially contributing to the opacity or hiding capability of a coating. Pigments typically have a refractive index of equal to or greater than 1.8 and include zinc oxide, zinc sulfide, barium sulfate, and barium carbonate. For the purpose of clarity, titanium dioxide particles of the present invention are not included in the "pigment" of the present invention.

The term "extender" refers to a particulate inorganic materials having a refractive index of less than or equal to 1.8 and greater than 1.3 and include calcium carbonate, aluminium oxide ($Al_2O_3$), clay, calcium sulfate, aluminosilicate, silicate, zeolite, mica, diatomaceous earth, solid or hollow glass, and ceramic bead. The coating composition may optionally contain solid or hollow polymeric particles having a Tg of greater than 60° C., such polymeric particles are classified as extenders for purposes of pigment volume concentration (PVC) calculations herein. The details of hollow polymeric particles are described in EP 22633, EP 915108, EP 959176, EP 404184, U.S. Pat. No. 5,360,827, WO 00/68304, and US 20100063171. The solid polymeric particles have particle sizes of from 1 to 50 microns, and preferably from 5 to 20 microns. A suitable example of the polymeric particles is ROPAQUE™ Ultra E opaque polymer commercially available from The Dow Chemical Company. For the purpose of clarity, the polymeric particles of the present invention are different from the first or the second polymer of the present invention. Calcium carbonate, clay, mica, and aluminium oxide ($Al_2O_3$) are preferred extenders.

PVC (pigment volume concentration) of the coating composition is calculated as follows, PVC (%)=[volume of pigment(s)+volume of extender(s)]/total dry volume of coating.

In a preferred embodiment, the coating composition has a PVC of from 10% to 75%, and preferably from 20% to 70%.

Preparation of the Coating Composition

The preparation of the coating composition involves the process of selecting and admixing appropriate coating ingredients in the correct proportions to provide a coating with specific processing and handling properties, as well as a final dry coating film with the desired properties.

Application of the Coating Composition

The coating composition may be applied by conventional application methods such as brushing, roller application, and spraying methods such as air-atomized spray, air-assisted spray, airless spray, high volume low pressure spray, and air-assisted airless spray.

Suitable substrates for coating application include concrete, cement board, medium-density fiberboard (MDF) and particle board, gypsum board, wood, stone, metal, plastics, wall paper and textile, etc. Preferably, all the substrates are pre-primed by waterborne or solvent-borne primers.

EXAMPLES

I. Raw Materials

| A) Chemicals used in making polymers | |
|---|---|
| Abbreviation | Chemical |
| BA | butyl acrylate |
| MMA | methyl methacrylate |
| (M)AA | (methyl)acrylic acid |
| SEM | 2-sulfoethyl methacrylate |
| DMAEMA | 2-(dimethylamino)ethyl methacrylate |
| n-DDM | n-dodecyl mercaptan |
| AIBN | 2,2'-azobis(isobutyronitrile) |
| DS-4 | sodium dodecyl benzene sulfonate |
| EDTA | ethylene diamine tetraacetic acid |
| t-BHP | tert-butyl hydroperoxide |

| B) starting materials used in coating formulations | |
|---|---|
| Chemical | Supplier |
| FOAMASTER™ NXZ defoamer | Cognis Chemical (China) Co., Ltd. |
| FOAMASTER™ A10 defoamer | Cognis Chemical (China) Co., Ltd. |
| Propylene glycol | Sinopharm Chemical Reagent Co., Ltd. |
| Ethylene glycol | Sinopharm Chemical Reagent Co., Ltd. |
| Diethylene glycol | Sinopharm Chemical Reagent Co., Ltd. |
| AMP-95™ base | The Dow Chemical Company |
| OROTAN™ 1288 dispersant | The Dow Chemical Company |
| OROTAN™ 1124 dispersant | The Dow Chemical Company |
| TRITON™ EF-106 wetting agent | The Dow Chemical Company |
| TRITON™ 15-s-40 wetting agent | The Dow Chemical Company |
| ACRYSOL™ TT-935 rheology modifier | The Dow Chemical Company |
| ACRYSOL™ RM-8W rheology modifier | The Dow Chemical Company |
| ACRYSOL™ RM-12W rheology modifier | The Dow Chemical Company |
| ACRYSOL™ RM-845 rheology modifier | The Dow Chemical Company |
| ACRYSOL™ RM-2020 rheology modifier | The Dow Chemical Company |
| NATROSOL™ 250 MBR rheology modifier | Ashland Aqualon Company |
| NATROSOL™ 250 HBR rheology modifier | Ashland Aqualon Company |
| Ammonia (28%) | Sinopharm Chemical Reagent Co., Ltd. |
| TI-PURE™ R-706 $TiO_2$ | DuPont Company |
| CC-700 calcium carbonate extender | Guangfu Building Materials Group (China) |
| Celite-499 extender | Celite Corp. |
| DB-80 calcined kaolin | Guangfu Building Materials Group (China) |
| Talc-800 extender | Guangfu Building Materials Group (China) |
| COASOL™ coalescent | The Dow Chemical Company |
| TEXANOL™ coalescent | The Dow Chemical Company |
| PRIMAL™ SF-018 binder | The Dow Chemical Company |
| PRIMAL™ SF-155 binder | The Dow Chemical Company |
| PRIMAL™ AC-261 binder | The Dow Chemical Company |
| ROPAQUE™ Ultra E opaque polymer | The Dow Chemical Company |
| SILVERDUE™ ET | The Dow Chemical Company |
| Silver nitrate (1%) | Sinopharm Chemical Reagent Co., Ltd. |

II. Test Procedures

Yellowing Resistance Determination

Coating drawdown was made with a 200 um Bird film applicator on a cement board coated with primer, and then was allowed for 1-day drying in a constant temperature room (CTR). The dried coating films were placed beside the glass window for sun exposure. B values of the films were measured in two weeks by a BYK-Gardner color-guide sphere spectrophotometer.

III. Experimental Examples

1. Preparation of the second polymer encapsulated titanium dioxide particles dispersion A 250 ml flask equipped with a magnetic stirrer, $N_2$-inlet, reflux condenser, heating mantel, and thermocouple was charged with 20 g of SEM, 4 g of DMAEMA, 10 g of BA, 16 g of MMA, 1.1 g of n-DDM, 0.5 g of AIBN, and 100 g of n-propanol. The flask was purged with $N_2$, and heated to 60° C., at which point the heating mantel was turned off and the reaction mixture was allowed to heat to 80° C. with exotherm. The heating mantel was turned on and the reaction mixture was held at 80° C. for 3 hours. The temperature was then raised to 93° C., and 0.25 g of AIBN in 2.0 g n-propanol was added. The temperature was held at 93° C. for 1 hr. The flask was then cooled to room temperature. The product was poured into 100 ml of hexane, and then the solid polymer was collected and dried. The dried polymer was dissolved in sufficient water and $NH_3$ to make a 21.3% solution at pH 5.0.

A steel grind pot was charged with 31.7 g of the solution and 95.2 g water. 450 g TI-PURE R-706 $TiO_2$ was added slowly while grinding at 2000 rpm using a Model 50 Lab Dispersator from Netzsch Group equipped with a disk blade. The mixture was ground for 20 min, and then an additional 11.3 g of water was added to make a 76.5% TI-PURE R-706 $TiO_2$ slurry.

A 1-gallon four-neck round-bottom flask equipped with a paddle stirrer, $N_2$-inlet condenser, heating mantel, and thermocouple was charged with 1816 g of the slurry along with a solution of 13.81 g DS-4 (23% solids) in 251.05 g DI water. The flask was purged with $N_2$, and heated to 30° C. Then 50 g 0.1% iron sulfate and 4 g 1% EDTA were added into the reactor. Two minutes later, co-feed #1 consisting of 2 g t-BHP dissolved in 110.53 g DI water and co-feed #2 consisting of 8.28 g IAA dissolved in 96.25 g DI water were fed to the reactor. Two minutes after the addition of the co-feed solutions, a first monomer emulsion (ME1) prepared previously by mixing 56.52 g DI water, 6.9 g DS-4, 119.3 g BA, 139.7 g MMA and 2.6 g MAA was fed to the reactor. Then, a second monomer emulsion (ME2) prepared previously by mixing 269.5 g DI water, 20.71 g DS-4, 355.5 g BA, 416.3 g MMA and 7.8 g MAA was fed to the reactor. Reaction continued for another 20 min. The contents of the reactor were then cooled to room temperature, followed by feeding 84 g NaOH solution (6% solids) in 40 min. Small amounts of gel were filtered by a 100 mesh filter. The remainder was the second polymer encapsulated titanium dioxide particles dispersion of the present invention. The dispersion comprised 33% titanium dioxide, 26% the second polymer, and water.

2. Preparation of the Antimicrobial Coating Composition

Comparative Coatings (Comp.) 1, 4, 6 and 8 containing different amounts of titanium dioxide particles (100% un-encapsulated) were prepared according to Table 1 using the following procedure. The grind ingredients were mixed using a high speed Cowles disperser. The let-down ingredients were added using a conventional lab mixer. The PVCs of comparative coatings 1, 4, 6 and 8 were 45%, 26%, 67% and 45% respectively.

Coatings 2, 3, 5, 7 and 9 containing different amounts of the second polymer encapsulated titanium dioxide particles were prepared according to Table 2 using the same procedure as described in the preparation of Comparative Coatings. Coating 3 comprised based on total weight of the coating, 11.1% of un-encapsulated titanium dioxide and 25.9% of the second polymer encapsulated titanium dioxide. The PVCs of coatings 2, 3, 5, 7 and 9 were 45%, 45%, 26%, 67% and 45% respectively.

Comparative Coating 8 and coating 9 used silver nitrite (1%), while the other coatings used SILVERDUE ET as the silver component, and each of the silver contents was listed in Table 3.

TABLE 1

Comparative coating formulation

| Materials | Weight (g) |
|---|---|
| "Grind" | |
| Water | 200.0 |
| Propylene glycol solvent | 15.0 |
| OROTAN 1288 dispersant | 3.0 |
| TRITON EF-106 wetting agent | 1.5 |
| FOAMASTER NXZ defoamer | 1.0 |
| NATROSOL 250 HBR rheology modifier | 3.0 |
| AMP-95 base | 2.5 |
| TI-PURE R-706 $TiO_2$ | 180.0 |
| CC-700 calcium carbonate extender | 80.0 |
| DB-80 calcined kaolin | 30.0 |
| "Let-down" | |
| PRIMAL AC-261 binder | 340.0 |
| TEXANOL coalescent | 20.0 |
| ROPAQUE Ultra E opaque polymer | 70.0 |
| FOAMASTER NXZ defoamer | 1.0 |
| ACRYSOL RM-845 rheology modifier | 2.5 |
| ACRYSOL RM-2020 rheology modifier | 9.0 |
| Water | 34.7 |
| SILVERDUE ET/Silver nitrite | 6.8 |
| Total | 1000.00 |
| Coating characteristics | |
| Total PVC | 45% |

TABLE 2

Coating formulation

| Materials | Weight (g) |
|---|---|
| "Grind" | |
| Water | 119.7 |
| Propylene glycol | 15.0 |
| OROTAN 1288 dispersant | 1.5 |
| TRITON EF-106 wetting agent | 1.5 |
| FOAMASTER NXZ defoamer | 1.0 |
| NATROSOL 250 HBR rheology modifier | 3.0 |
| AMP-95 base | 2.5 |
| TI-PURE R-706 $TiO_2$ | 0.0 |
| CC-700 calcium carbonate extender | 80.0 |
| DB-80 calcined kaolin | 30.0 |
| "Let-down" | |
| The second polymer encapsulated $TiO_2$ dispersion | 545.4 |
| PRIMAL AC-261 binder | 56.4 |
| TEXANOL coalescent | 20.0 |
| ROPAQUE Ultra E opaque polymer | 70.0 |
| FOAMASTER NXZ defoamer | 1.0 |
| ACRYSOL RM-845 rheology modifier | 2.5 |
| ACRYSOL RM-2020 rheology modifier | 9.0 |

TABLE 2-continued

| Coating formulation | |
| --- | --- |
| Materials | Weight (g) |
| Water | 34.7 |
| SILVERDUE ET/silver nitrite | 6.8 |
| Total | 1000.00 |
| Coating characteristics | |
| Total PVC | 45% |

IV. Results and Analysis

TABLE 3

| Coatings | PVC (%) | Silver* (ppm) | TiO$_2$ Un-encapsulated (%) | TiO$_2$ Encapsulated (%) | B value Initial B | B value Final B | ΔB |
| --- | --- | --- | --- | --- | --- | --- | --- |
| Comp. 1 | 45% | 420 | 37% | — | 1.23 | 3.63 | +2.40 |
| 2 | 45% | 420 | — | 37% | 1.02 | 1.87 | +0.85 |
| 3 | 45% | 420 | 11.1% | 25.9% | 1.03 | 2.20 | +1.17 |
| Comp. 4 | 26% | 700 | 35% | — | 0.96 | 2.97 | +2.01 |
| 5 | 26% | 700 | — | 35% | 0.75 | 1.28 | +0.53 |
| Comp. 6 | 67% | 200 | 21% | — | 1.68 | 5.40 | +3.72 |
| 7 | 67% | 200 | — | 21% | 1.25 | 2.26 | +2.01 |
| Comp. 8# | 45% | 200 | 37% | — | 1.37 | 1.73 | +0.36 |
| 9# | 45% | 200 | — | 37% | 0.79 | 0.43 | −0.36 |

*Silver concentrations listed in Table 3 are dry weights based on total dry weight of the coating composition;
Comparative Coating 8 and Coating 9 used silver nitrite (1%), while the other coatings used SILVERDUE ET as the silver component.

As shown in Table 3, silver-containing coating compositions comprising the second polymer encapsulated TiO$_2$ have improved yellowing resistances compared to coating compositions comprising un-encapsulated TiO$_2$. For details, Coating 2 compared to Comparative Coating (Comp.) 1, Coating 5 compared to Comp. 4, Coating 7 compared to Comp. 6, Coating 9 compared to Comp. 8, all showed reduced ΔB value, which indicated that the yellowing issue caused by silver in the coating composition was improved by encapsulating TiO$_2$. As indicated by the result of Coating 3, 70% (25.9/(11.1+25.9)=70%) encapsulation of the TiO$_2$ is enough to achieve the improved yellowing resistance performance.

What is claimed is:

1. An antimicrobial coating composition comprising,
   i) a first polymer; and
   by dry weight based on total dry weight of the coating composition,
   ii) from 50 ppm to 2000 ppm of at least one of silver ions (Ag$^{1+}$) and silver element) (Ag$^0$); and
   iii) from 10% to 60% of titanium dioxide particles;
   wherein from 70% to 100% by weight of the titanium dioxide particles are encapsulated by a second polymer; and
   the total amount of the first and the second polymers is from 5% to 80% by dry weight based on total dry weight of the coating composition,
   wherein the first polymer and the second polymer each independently comprises an ethylenically unsaturated nonionic monomer and a stabilizer monomer, wherein:
   the ethylenically unsaturated nonionic monomer of the first and second polymer is each independently methyl methacrylate, ethyl acrylate, butyl acrylate, 2-ethylhexyl acrylate, styrene, vinyl acetate, vinyl butyrate, or a combination thereof; and
   the stabilizer monomer of the first and second polymer is each independently sodium styrene sulfonate, sodium vinyl sulfonate, 2-acrylamido-2-methylpropane sulfonic acid, acrylamide, acrylic acid, methacrylic acid, itaconic acid, or a combination thereof.

2. The coating composition according to claim 1 wherein the silver ions are selected from silver nitrate, silver iodide, and the combination thereof.

3. The coating composition according to claim 1 comprising from 200 ppm to 700 ppm by dry weight based on total dry weight of the coating composition, of at least one of silver ions and silver element.

4. The coating composition according to claim 1 comprising from 20% to 40% by dry weight based on total dry weight of the coating composition, of titanium dioxide particles.

5. The coating composition according to claim 1 wherein the total amount of the first and the second polymers is from 15% to 60% by dry weight based on total weight of the coating composition.

6. The coating composition according to claim 1 wherein the coating composition further comprises an extender, wherein the extender is calcium carbonate, clay, mica, aluminium oxide, or a combination thereof.

7. An antimicrobial coating composition comprising,
   i) a first polymer; and
   by dry weight based on total dry weight of the coating composition,
   ii) from 200 ppm to 700 ppm of at least one of silver ions and silver element; and
   iii) from 20% to 40% of titanium dioxide particles;
   wherein from 70% to 100% by weight of the titanium dioxide particles are encapsulated by a second polymer; and
   the total amount of the first and the second polymers is from 15% to 60% by dry weight based on total dry weight of the coating composition,
   wherein the second polymer consists essentially of an ethylenically unsaturated nonionic monomer and a stabilizer monomer, wherein:
   the ethylenically unsaturated nonionic monomer is methyl methacrylate, ethyl acrylate, butyl acrylate, 2-ethylhexyl acrylate, styrene, vinyl acetate, vinyl butyrate, or a combination thereof; and
   the stabilizer monomer is sodium styrene sulfonate, sodium vinyl sulfonate, 2-acrylamido-2-methylpropane sulfonic acid, acrylamide, acrylic acid, methacrylic acid, itaconic acid, or a combination thereof.

8. The antimicrobial coating composition according to claim 7,
   wherein the ethylenically unsaturated nonionic monomer is methyl methacrylate, butyl acrylate, styrene, vinyl acetate, or a combination comprising at least one of the foregoing;
   wherein the stabilizer monomer is methacrylic acid; and
   wherein the silver ions are silver nitrate, silver iodide, or a combination thereof.

9. The antimicrobial coating composition according to claim 7, wherein the ethylenically unsaturated nonionic monomer is a combination of methyl methacrylate and butyl acrylate;
wherein the stabilizer monomer is methacrylic acid; and
wherein the silver ions are silver nitrate, silver iodide, or a combination thereof.

* * * * *